(12) United States Patent
Nea

(10) Patent No.: US 10,487,569 B2
(45) Date of Patent: Nov. 26, 2019

(54) SPACERS FOR INSULATED GLASS

(71) Applicant: Rey Nea, Ontario, CA (US)

(72) Inventor: Rey Nea, Ontario, CA (US)

( * ) Notice: Subject to any disclaimer, the term of this patent is extended or adjusted under 35 U.S.C. 154(b) by 135 days.

(21) Appl. No.: 15/872,600

(22) Filed: Jan. 16, 2018

(65) Prior Publication Data

US 2019/0218851 A1    Jul. 18, 2019

(51) Int. Cl.
| | | |
|---|---|---|
| *E06B 3/663* | (2006.01) | |
| *B29C 65/48* | (2006.01) | |
| *E06B 3/677* | (2006.01) | |
| *B29L 31/00* | (2006.01) | |
| *E06B 3/673* | (2006.01) | |
| *B32B 15/09* | (2006.01) | |
| *B32B 15/20* | (2006.01) | |
| *B32B 15/14* | (2006.01) | |
| *B32B 3/28* | (2006.01) | |

(52) U.S. Cl.
CPC ...... *E06B 3/66314* (2013.01); *B29C 65/4805* (2013.01); *E06B 3/66328* (2013.01); *E06B 3/66333* (2013.01); *E06B 3/66352* (2013.01); *B29L 2031/778* (2013.01); *B32B 3/28* (2013.01); *B32B 15/09* (2013.01); *B32B 15/14* (2013.01); *B32B 15/20* (2013.01); *E06B 3/6736* (2013.01); *E06B 3/6775* (2013.01); *E06B 2003/6639* (2013.01); *E06B 2003/66385* (2013.01); *E06B 2003/66395* (2013.01); *Y02B 80/22* (2013.01); *Y10T 428/24694* (2015.01)

(58) Field of Classification Search
CPC ............. E06B 3/66314; E06B 3/66328; E06B 3/66352; E06B 3/66333; E06B 2003/6639; B32B 3/28; B32B 15/14; B32B 15/09; B32B 15/20; Y10T 428/24694; Y02B 80/22; Y02B 80/24
See application file for complete search history.

(56) References Cited

U.S. PATENT DOCUMENTS

| | | | |
|---|---|---|---|
| 9,074,416 B1 * | 7/2015 | Nea | ..... E06B 3/66342 |
| 9,243,443 B2 * | 1/2016 | Nea | ..... E06B 3/66342 |

* cited by examiner

*Primary Examiner* — Donald J Loney
(74) *Attorney, Agent, or Firm* — Laura M. King; Matrix Law Group, LLP

(57) ABSTRACT

This invention provides a sealing spacer for spacing apart two window panes to form a window assembly. The spacer has an elongated, flexible strip having opposed edge surfaces and opposed side surfaces. The spacer also has a fiber reinforced polymer layer over the elongated, flexible strip. The opposed edge surfaces undulate with crests and troughs. The spacer has an activatable sealant for directly sealingly securing the flexible strip to each of the two window panes. The activatable sealant is on each of the opposed side surfaces of the fiber reinforced polymer. The invention also provides methods for making the spacer and window assembly.

17 Claims, 4 Drawing Sheets

SPACERS FOR INSULATED GLASS

BACKGROUND

Insulated windows are assembled by spacing two layers of glass in a fixed relationship. The layers of glass are fixed together at the outer edges of the glass with a removable or permanent spacer plus a sealant, or a structure that contains both a sealant and spacer. The layers of glass are sealed together, forming a sandwich structure that contains the sealant and/or spacer between the glass layers. There is also a sealed air pocket between the two glass layers.

The formation of a window assembly requires multiple steps when a removable spacer is used. First, the spacer must be placed between the glass layers. Second, the sealant is injected at the edges of the glass. Third, the sealant is cured. Fourth, the spacer is removed. This process is labor intensive and requires expensive equipment.

In contrast, when a permanent spacer is used, an adhesive is applied to secure the permanent spacer between the two pieces of glass. The spacer is then set in place, followed by injection of a sealant between the spacer and the edges of the sheets of glass. This process is also labor intensive.

An alternative method of manufacturing insulated windows uses a unitary structure containing both a sealant and spacer. Sealant and spacer structures that are currently used are made of a flexible, hollow metal material which has a support structure that is folded over the two edges and one side of the hollow metal material, as in U.S. Pat. Nos. 4,431,691 and 8,230,661. This support structure has many disadvantages, including increased manufacturing costs for materials and labor. Additionally, the presence of a support structure makes the spacer rigid and hard to bend to allow a 90 degree angle to be formed at the corners of a window assembly.

FRP reinforcements offer a number of advantages such as corrosion resistance, non-magnetic properties, high tensile strength, lightweight and ease of handling.

SUMMARY

There is a need for a window assembly system with a spacer that functions as a unitary sealant and spacer for window panes without a support structure. This system has many advantages; for example, the spacer of the present invention costs less in materials and labor to manufacture, and allows for more flexibility in forming the corners of a window assembly, and increases the stability of the spacer. The spacer described herein contains a fiber reinforced polymer, which offers a number of advantages such as corrosion resistance, non-magnetic properties, high tensile strength, improved rigidity of the system, improved straightness of the panes, low weight of the spacer and assembly, and ease of handling.

The present invention is directed, in part, to a system containing a sealing spacer for spacing apart two window panes. The spacer has an elongated, flexible strip having opposed edge surfaces and opposed side surfaces which undulate with crests and troughs. The spacer also has a substantially flat strip having an inner surface and an opposed outer surface. A first adhesive adheres the inner surface of the substantially flat strip to the crests of one of the opposed edge surfaces of the elongated strip. A second adhesive adheres the outer surface of the substantially flat strip to a fiber reinforced polymer having a top surface and opposed side surfaces, the fiber reinforced polymer shaped to cover the outer surface of the substantially flat strip and the opposed side surfaces of the elongated strip. The spacer also has an activatable sealant on each of the opposed side surfaces of the fiber reinforced polymer.

The substantially flat strip can be metal such as aluminum. The substantially strip can also contain a desiccant.

The invention is also directed to a window assembly comprising two window panes sealingly secured by the spacer of the invention.

The invention is also directed to a window assembly comprising a spacer assembly for spacing apart two window panes. The spacer assembly has an elongated, flexible strip having opposed edge surfaces and opposed side surfaces which undulate with crests and troughs. The spacer assembly also has a substantially flat strip having an inner surface and an opposed outer surface. A first adhesive adheres the inner surface of the substantially flat strip to the crests of one of the opposed edge surfaces of the elongated strip. A second adhesive adheres the outer surface of the substantially flat strip to a fiber reinforced polymer having a top surface and opposed side surfaces, the fiber reinforced polymer shaped to cover the outer surface of the substantially flat strip and the opposed side surfaces of the elongated strip. The spacer also has an activatable sealant on each of the opposed side surfaces of the fiber reinforced polymer. The window assembly also has two window panes sealingly adhered to the opposed edge surfaces of the spacer by the activatable sealant. In one embodiment, the window panes comprise glass panes.

DRAWINGS

These and other features, aspects, and advantages of the present invention will become better understood with regard to the following description, appended claims, and accompanying drawings:

DESCRIPTION

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

An "activatable sealant" is a sealant that adheres to an object such as a fiber reinforced polymer by the application of pressure, elevated temperature, or a combination of pressure and elevated temperature.

As used herein, the term "comprise" and variations of the term, such as "comprising" and "comprises," are not intended to exclude other additives, components, integers or steps.

A "desiccant" is a material that functions to minimize the effects of moisture. The desiccant prevents moisture from condensing on the interior surface of the window assembly. A desiccant can be part of the spacer, sealant, or spacer/sealant structure.

As used herein the term "sealingly secure" means an activatable sealant that is able to form an air-tight seal with a second material.

"Fiber reinforced polymer" refers to a composite material made of a polymer matrix reinforced with fibers. The fibers can be any strong, stiff material or combination of material, for example, glass, metal, ceramic, carbon, paper, wood or asbestos or a combination thereof. The polymer can be any material or combination of material such as, for example, epoxy or polyester resin, vinylester or polyester thermosetting plastic, and phenol formaldehyde resin, polyethylene, polypropylene, polystyrene, polyvinyl chloride, synthetic rubber, phenol formaldehyde resin, neoprene, nylon, polyacrylonitrile, PVB, and silicone.

The present invention is directed, in part, to a window assembly system containing a spacer for spacing apart transparent or translucent materials such as glass and plastic window panes.

In contrast to spacers used in prior window assemblies, the spacer of the present invention functions as a unitary sealant and spacer without the need for a support structure. The present invention has many advantages over the currently used spacers; for example, the spacer of the present invention costs less in materials and labor to manufacture, is lightweight, has increased stability, and allows for more flexibility in forming the corners of a window assembly.

Figure 1:
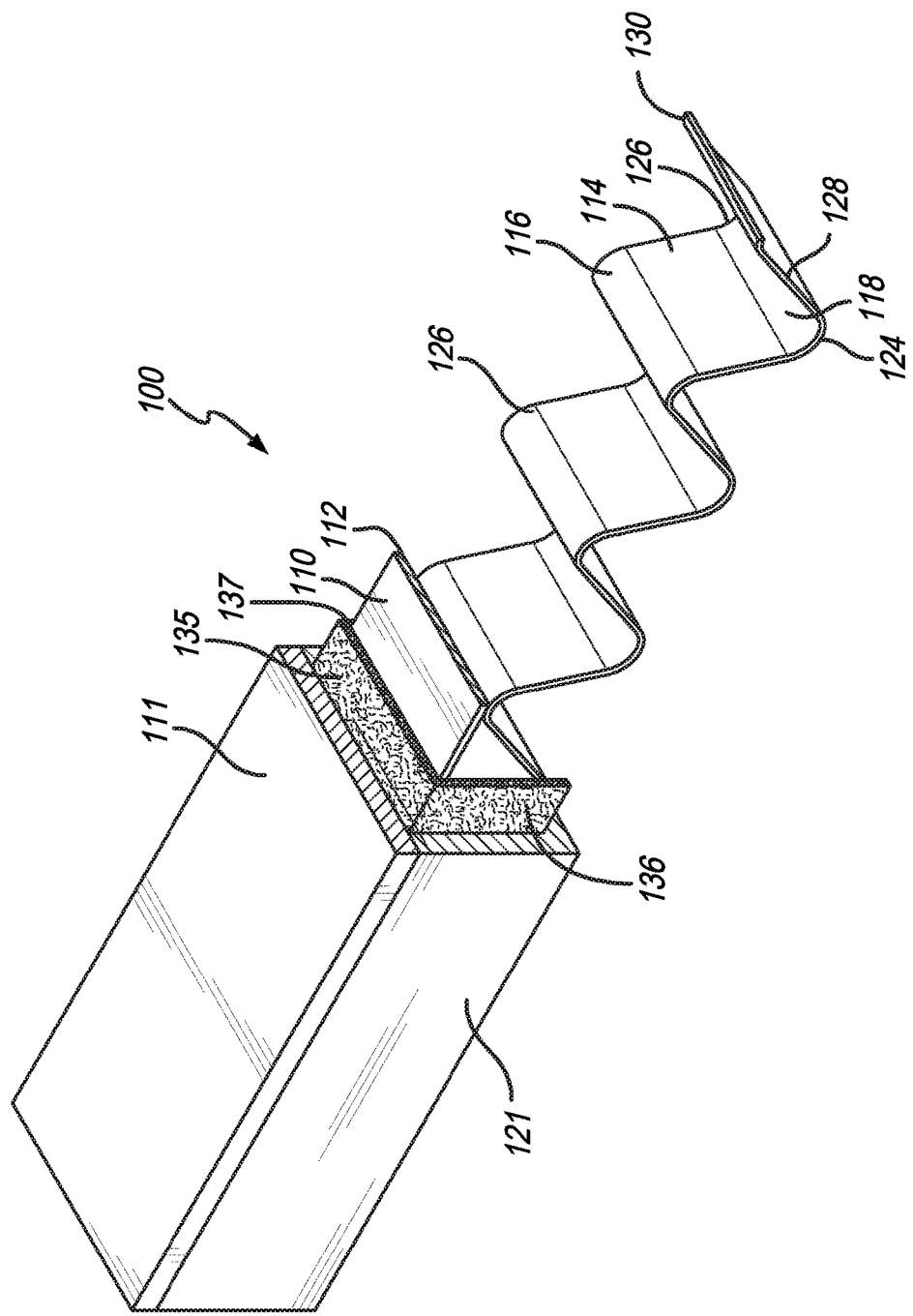
FIG. 1 is a partially broken top perspective view of a version of a spacer having features of the present invention.
Figure 2:
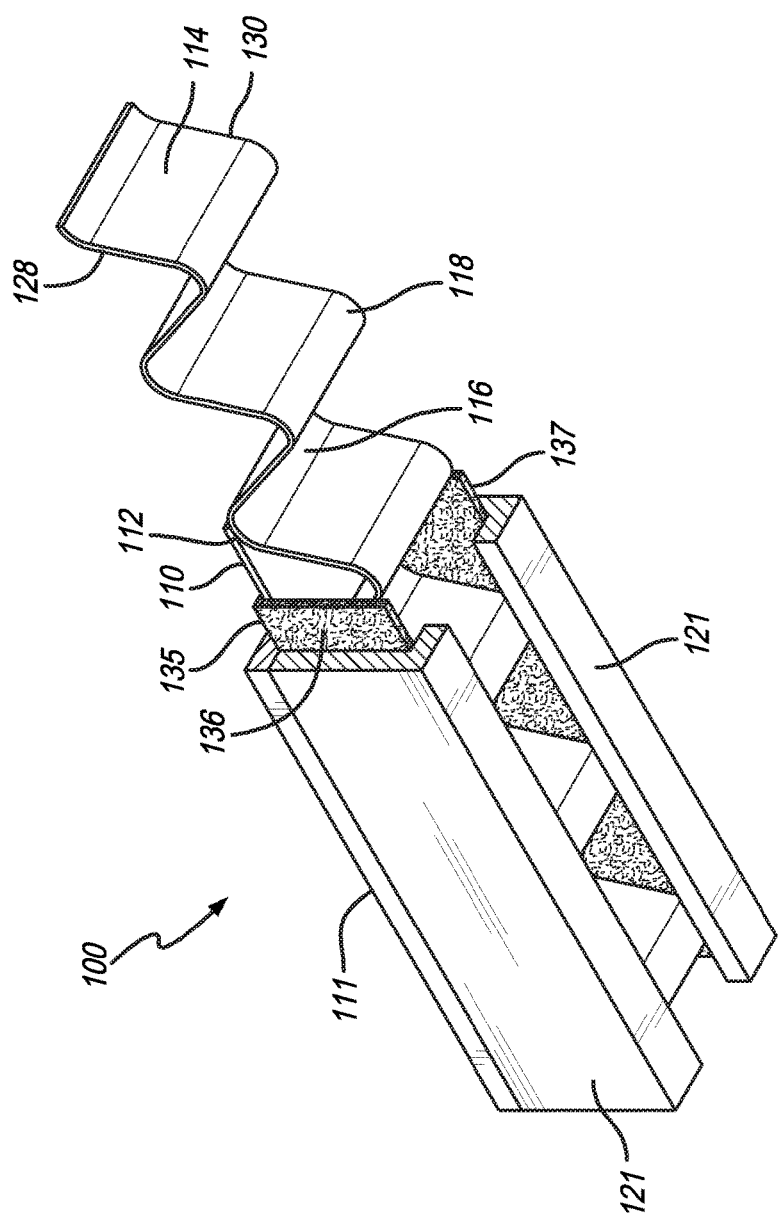
FIG. 2 is a partially broken bottom perspective view of a first version of a spacer having features of FIG. 1.
Figure 3:
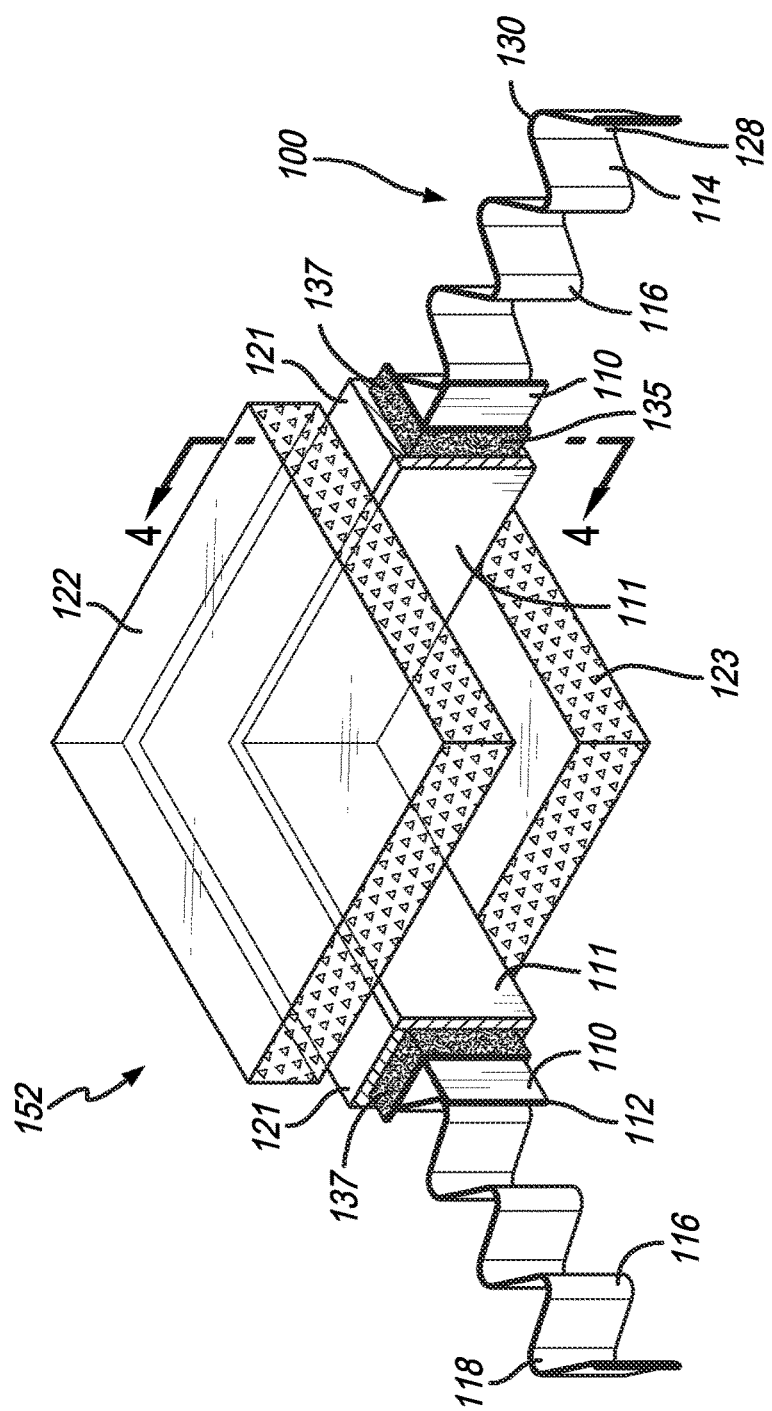
FIG. 3 is a partially broken perspective view of a first version of a spacer having features of FIG. 1 in a window assembly.
Figure 4:
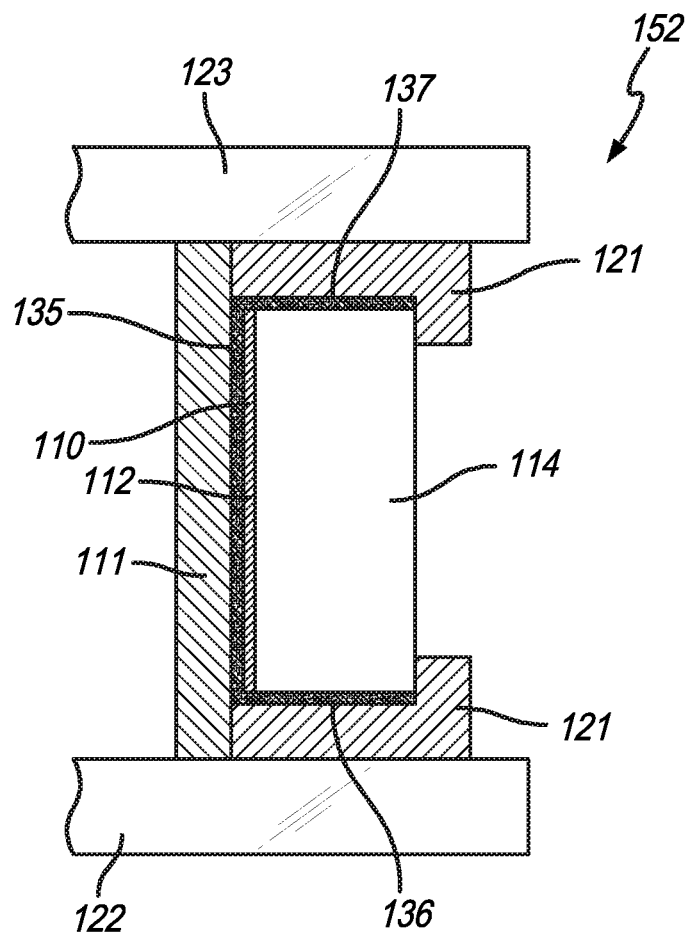
FIG. 4 is a cross sectional view of the window assembly of FIG. 3.

FIGS. 1 and 2 depict a spacer 100 comprising an elongated, flexible strip 114 having an opposed first edge surface 124 and a second edge surface 126 which undulates with crests 116 and troughs 118. The flexible strip 114 also has an opposed first side surface 128 and second side surface 130. FIGS. 3 and 4 depict a window assembly 152 wherein the spacer 100 is used to space apart a first window pane 122 and a second window pane 123.

The first and second side surfaces 128, 130 of the flexible strip 114 are rigid in order to resist compressive forces from the window panes 122, 123, while the edge surfaces 124, 126 are sufficiently flexible to bend. The flexible strip 114 can be made of any rigid material, such as, for example, plastic such as polycarbonate (PC) or polyethylene terephthalate (PET), or a metal such as aluminum.

The spacer also contains a substantially flat strip 110, the bottom of which is adhered to the crests 116 of the second edge surface 126 of the flexible strip 114. The substantially flat strip 110 can be made out of any rigid material, such as metal. A metal that can be used is, for example, aluminum. The substantially flat strip 110 is adhered to the crests 116 of the second edge surface 126 of the flexible strip 114 with an adhesive 112. An adhesive 112 can be any material that allows the substantially flat strip 110 to adhere to the flexible strip 114. For example, the adhesive 112 can be hot melt sealant butyl rubber.

The spacer 100 also comprises a fiber reinforced polymer 135 which covers the side surfaces 128, 130 of the flexible strip 114 and the top of the substantially flat strip 110. The fiber reinforced polymer 135 is preferably formed from one piece of fiber reinforced polymer and is folded or formed over the side surfaces 128, 130 of the flexible strip 114 and the top of the substantially flat strip 110, forming two side surfaces 136, 137. The fiber reinforced polymer 135 is attached to the substantially flat strip 100 with adhesive 112.

An activatable sealant 121 covers the side surfaces 136, 137 of the fiber reinforced polymer 135. Suitable materials for the activatable sealant 121 can be, for example, a polymer, a resin, or synthetic rubber. Preferably, the activatable sealant 121 is butyl rubber. A desiccant 111 can cover the top of the fiber reinforced polymer 135. The desiccant 111 removes moisture and optionally organic material from the space between the first and second window panes 122, 123. The desiccant can be, for example, silica, activated charcoal, calcium sulfate, calcium chloride, molecular sieves, or a combination of one or more desiccants.

The activatable sealant 121 is used for directly sealingly securing the fiber reinforced polymer 135 covered flexible strip 114 to each of the two window panes, wherein the activatable sealant 121 completely covers the opposed side surfaces 136, 137 of the fiber reinforced polymer 135, as shown in FIGS. 1 and 2. An advantage of having an activatable sealant 121 which completely covers the side surfaces 136, 137 of the fiber reinforced polymer 135 is that there is better contact between the activatable sealant 121 and the fiber reinforced polymer 135 covered flexible strip 114, which increases the overall stability of the spacer 100 when it is used to space apart two window panes 122, 123.

The thickness of the activatable sealant 121 is sufficient to maintain a continuous seal between the spacer 100 structure and the two window panes 122, 123. However, the activatable sealant 121 cannot be so thick that it causes substantial distortion of the spacer 100 under applied compressive forces.

The invention is also directed to a method for making the spacer 100 described above. First, the substantially flat strip 110 is adhered to the crests 116 of the second edge surface 126 of the flexible strip 114 with an adhesive 112 such as, for example, hot melt sealant butyl rubber.

Next, the flexible strip 114 is placed on the adhesive 112, joining the substantially flat strip 110 to the second edge surface 126 of the flexible strip 114. A pressure of between 0.5 and 1.0 kilograms per square meter is applied to the substantially flat strip 110/flexible strip 114 structure to allow the structure to adhere.

More adhesive 112 is extruded onto the top of the substantially flat strip 110, and the fiber reinforced polymer 135 is joined to the substantially flat strip 110 by the use of pressing rollers. The sides 136, 137 of the fiber reinforced polymer 135 are folded over the first and second side surfaces 128, 130 of the flexible strip 114 by pressing rollers.

Activatable sealant 121 is then extruded on the sides 136, 137 of the fiber reinforced polymer 135. The desiccant 111 is also extruded on top of and adhered to the top surface of the fiber reinforced polymer 135. During extrusion, the temperature of the extruder is 80° C. to 90° C. After extrusion, the spacer is cooled to room temperature.

The spacer 100 described above can be placed between two or more objects in order to space the objects apart and make an assembly such as, for example, a window assembly 152. In the window assembly 152, a first window pane 122 and second window pane 123 are spaced apart by the spacer 100, as shown in FIGS. 3 and 4.

The first and second window panes 122, 123 can be any surfaces that are made out of a material such as glass, plastic, or Plexiglas. The window panes 122, 123 can be made out of the same material or different material. In one embodiment, the window panes 122, 123 spaced apart by the spacer 100 are glass panes.

The orientation of the spacer 100 is such that the side surfaces activatable sealant 121 comes into contact with the window panes 122, 123. The spacer 100 is able to resist substantial compressive forces exerted upon it in a direction perpendicular to the surface of the window panes 122, 123. As shown in FIG. 4, the desiccant 111 is oriented towards the inside of the window assembly 152.

The invention includes a method for forming a window assembly 152 comprising a spacer 100 and two window panes 122, 123 sealingly adhered to the opposed side surfaces 128, 130 of the spacer 100 by the activatable sealant 120. The method comprises placing the spacer 100 between the two window panes 122, 123, adhering the spacer 100 to the two window panes 122, 123 by heating the activatable sealant to at least 70° C. and/or applying pressure of at least 0.1 kilograms per square meter.

In order to form the continuous spacer 100 at a corner of the window assembly 152, spacer 100 is placed on one corner of the first window pane 122. The spacer 100 is then placed around the four sides and three edges of the first window pane 122 until a second end of the spacer 100 extends past the first end of the spacer 100. The second end of the spacer 100 is then folded on top of the first end of the spacer 100. Pressure is applied to the overlapping ends of the spacer 100, sealingly adhering the spacer 100 to itself.

The second window pane 123 is then placed on top of the first substantially parallel pane 122 and spacer 100, forming a sandwich structure. To ensure that the first and second substantially parallel panes 122, 123 and the spacer 100 are adhered securely together, pressure and/or temperature is then applied to the entire window assembly 152. In the window assembly 152, the space between the window panes 122, 123 is sealed from the atmosphere, and the air can be removed from the space. A gas such as argon can be introduced in the space between the window panes 122, 123.

The method of assembling a glass window assembly 152 can be used to manufacture new or replacement windows with two or more panes of glass. A triple-paned glass window assembly can also be made by repeating the steps above with a second spacer 100 and a third window pane.

EXAMPLE

A spacer was manufactured using the following method. First, a 0.03" thick butyl rubber adhesive was extruded onto the substantially flat strip at a temperature of 70-80° C. Second, the flexible strip, made out of corrugated aluminum, was placed on the butyl rubber adhesive on the substantially flat strip. A pressure of between 0.5 and 1.0 kilograms per square meter was applied to the substantially flat strip/butyl rubber/flexible strip structure.

Third, the fiber reinforced polymer was adhered to the substantially flat strip with butyl adhesive. The fiber reinforced polymer was then bent to cover the sides of the corrugated aluminum by pressing rollers.

Butyl rubber was extruded onto the entire side surfaces of the fiber reinforced polymer using an extruder at 80-90° C., and a die at 172-180° C. Simultaneously with the extrusion of the butyl rubber on the edge of the fiber reinforced polymer, a desiccant was extruded on top of and adhered to the top of the fiber reinforced polymer using an extruder at 70-80° C., and a die at 172-180° C. After extrusion, the structure was cooled to room temperature.

Although the present invention has been discussed in considerable detail with reference to certain preferred embodiments, other embodiments are possible. Therefore, the scope of the appended claims should not be limited to the description of preferred embodiments contained in this disclosure.

What is claimed is:

1. A sealing spacer for spacing apart two window panes comprising:
   a) an elongated strip having opposed edge surfaces and opposed side surfaces, wherein the opposed edge surfaces undulate with crests and troughs;
   b) a substantially flat strip having an inner surface and an opposed outer surface;
   c) a first adhesive adhering the inner surface of the substantially flat strip to the crests of one of the opposed edge surfaces of the elongated strip;
   d) a second adhesive adhering the outer surface of the substantially flat strip to a fiber reinforced polymer having a top surface and opposed side surfaces, the fiber reinforced polymer shaped to cover the outer surface of the substantially flat strip and the opposed side surfaces of the elongated strip; and
   e) an activatable sealant on each of the opposed side surfaces of the fiber reinforced polymer.

2. The spacer of claim 1, wherein the substantially flat strip is metallic.

3. The spacer of claim 2, wherein the substantially flat strip comprises aluminum.

4. The spacer of claim 1, further comprising desiccant on the top surface of the fiber reinforced polymer.

5. The spacer of claim 1, wherein the substantially flat strip is plastic.

6. The spacer of claim 1, wherein the elongated strip is plastic.

7. The spacer of claim 6, wherein the plastic is polyethylene terephthalate (PET).

8. The spacer of claim 1, wherein the adhesive is an activatable sealant.

9. The spacer of claim 1, where the activatable sealant is butyl rubber.

10. A window assembly comprising two window panes sealingly secured by the spacer of claim 1.

11. A window assembly comprising:
   (a) two window panes sealingly adhered to opposed side surfaces of a spacer assembly by an activatable sealant;
   (b) a spacer assembly for spacing apart the two window panes, the spacer assembly comprising:
      i) an elongated strip having opposed edge surfaces and opposed side surfaces, wherein the opposed edge surfaces undulate with crests and troughs;
      ii) a substantially flat strip having an inner surface and an opposed outer surface;
      iii) a first adhesive adhering the inner surface of the substantially flat strip to the crests of one of the opposed edge surfaces of the elongated strip;
      iv) a second adhesive adhering the outer surface of the substantially flat strip to a fiber reinforced polymer having a top surface and opposed side surfaces, the fiber reinforced polymer shaped to cover the outer surface of the substantially flat strip and the opposed side surfaces of the elongated strip; and
      v) an activatable sealant on each of the opposed side surfaces of the fiber reinforced polymer.

12. The window assembly of claim 11, wherein the window panes comprise glass panes.

13. The window assembly of claim 11, wherein the substantially flat strip is metallic.

14. The window assembly of claim 13, wherein the substantially flat strip comprises aluminum.

15. The window assembly of claim 11, wherein the spacer further comprises desiccant on the top surface of the fiber reinforced polymer.

16. The window assembly of claim 11, wherein the adhesive is an activatable sealant.

17. The window assembly of claim 16, where the activatable sealant is butyl rubber.

\* \* \* \* \*